April 1, 1952     J. M. GAYLORD     2,590,855
DYNAMOELECTRIC MACHINE AND COOLING MEANS
Filed June 23, 1950     2 SHEETS—SHEET 1

JAMES M. GAYLORD,
INVENTOR.

BY

ATTORNEYS

April 1, 1952   J. M. GAYLORD   2,590,855
DYNAMOELECTRIC MACHINE AND COOLING MEANS
Filed June 23, 1950   2 SHEETS—SHEET 2
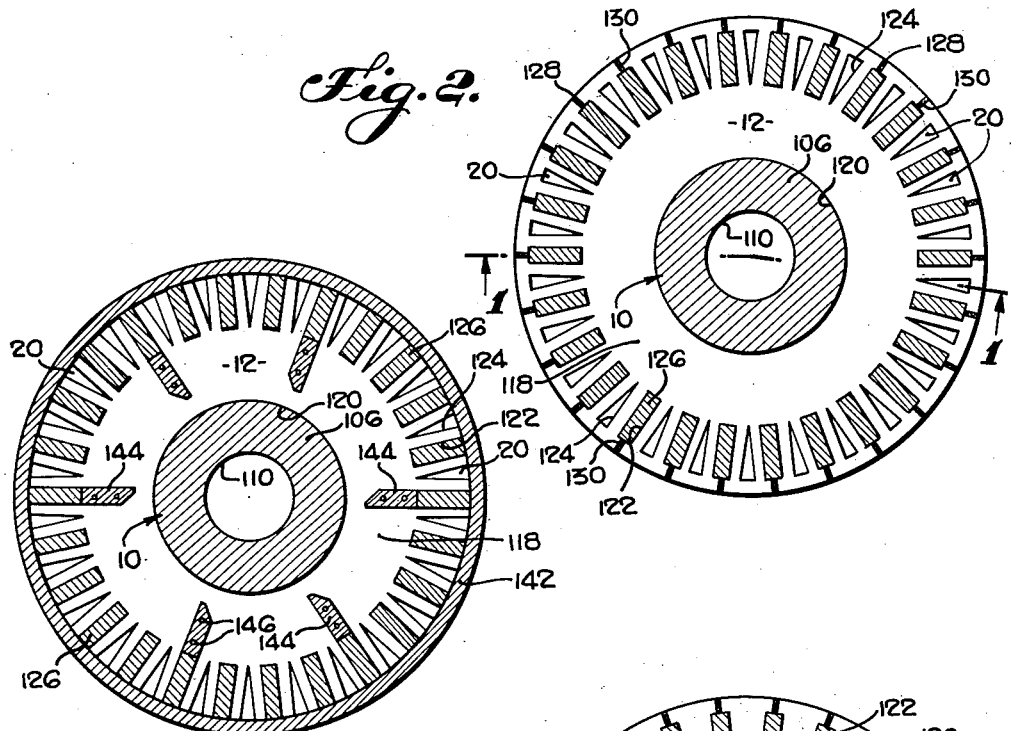
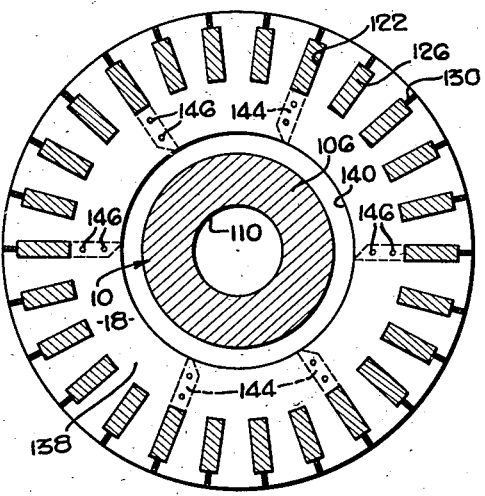
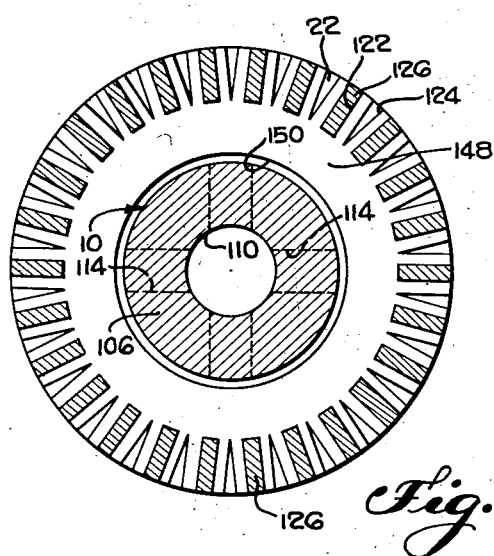
JAMES M. GAYLORD,
INVENTOR.
BY Lyon & Lyon
ATTORNEYS Patented Apr. 1, 1952

2,590,855

UNITED STATES PATENT OFFICE 2,590,855

DYNAMOELECTRIC MACHINE AND COOLING MEANS

James M. Gaylord, San Marino, Calif., assignor to Byron Jackson Co., Vernon, Calif., a corporation of Delaware Application June 23, 1950, Serial No. 170,003

6 Claims. (Cl. 171—252)

This invention relates to improvements in dynamo-electric machines, and more particularly to means for effectively cooling high speed machines of this general type.

It is frequently desired that the electrical and mechanical power rating of a dynamo-electric machine be increased without enlarging the overall size of the said machine, and the usual expedient is to increase the speed at which the motor is operated. However, as a general proposition, any increase in operating speed will result in a corresponding increase in the heat generated within the machine, and particularly in the rotor thereof. For this reason it is essential that such high speed machines be provided with heat dissipating means in order that the internal temperature rise of the machine be maintained within safe limits.

One of the expedients of the prior art for providing such a heat dissipating means has included the provision of a fan or impeller adapted to direct a flow of cooling medium, usually air, over the exterior of the machine. Such an arrangement has severe limitations, however, in that whereas the bulk of the cooling medium passes around the stator, only a comparatively small volume of said cooling medium is capable of penetrating the narrow rotor gap, and hence the rotor is particularly subject to overheating. In order to approach the problem of sufficiently cooling the rotor, it has been suggested that the rotor in such a machine be equipped with a plurality of axial ducts or passages through which might flow the cooling medium. While such an arrangement is undoubtedly more effective than a mere external flow over the machine, considerable difficulty is encountered, particularly at the higher speeds, in forcing a sufficient volume of cooling medium through the rotor ducts. The use of fans or impellers of increased size or power requirements may serve to ameliorate this condition, but at the same time serve to lower the overall efficiency of the machine.

Moreover, when such larger fans, impellers, and the like, are used, the advantage of increased electrical and mechanical power rating of the machine itself in a small size machine is largely lost by virtue of the space requirements of the said fans or impellers. In order to avoid this difficulty, therefore, it has been suggested that so far as concerns cooling of the rotor itself, the cooling medium be forced through an axial bore of the shaft of the device, thence circulated through the rotor, and hence back to another bore in the shaft on the other side of said rotor and thereafter from the said shaft. The disadvantages in this system are, first, the necessary length of passage of the cooling medium through the shaft and the consequent loss of pressure therein and, second, the loss of centrifugal head in flowing the fluid from the rotor back to the shaft which might otherwise be utilized to enhance cooling medium flow. Any necessary passage of cooling medium from adjacent the periphery of the rotor radially inwardly towards the rotor axis creates a condition wherein there will be found a centrifugal head opposing passage of the cooling medium through the rotor and hence will be required additional pressure means if sufficient cooling of the rotor is to be obtained.

It is consequently the object of this invention to provide a dynamo-electric machine having novel means for providing the flow of cooling medium through the rotor and thereafter from the rotor for heat transfer and recirculating purposes.

It is another object of this invention to provide such a machine wherein passage of said cooling medium is not entirely dependent upon auxiliary pressuring means, but is provided in large part through centrifugal forces.

Yet another of the objects of the invention is to provide such a machine wherein the primary cooling medium pressure providing means is not exterior of the rotor, and thus space-consuming, but rather is an integral part of said rotor.

A further object of the invention consists in the provision of said pressuring means as not only integral with the rotor itself, but comprised at least in part of portions of the rotor which, in addition to providing the aforesaid pressure, are operating parts of the rotor itself.

Yet a further object of the invention consists in the avoidance of any opposing centrifugal head or heads, which might impede the desired passage of the cooling medium through the rotor.

Further objects of the invention will appear hereinafter.

In the drawings:

Figure 2 shows a cross-sectional view through the rotor of said machine, taken on the line 2—2 of Figure 1;

Figure 3 shows a cross-sectional view through the rotor of said machine, taken on the line 3—3 of Figure 1;

Figure 4 shows a cross-sectional view through the rotor of said machine, taken on the line 4—4 of Figure 1; and Figure 5 shows a cross-sectional view through the rotor of said machine, taken on the line 5—5 of Figure 1.

Figure 1:
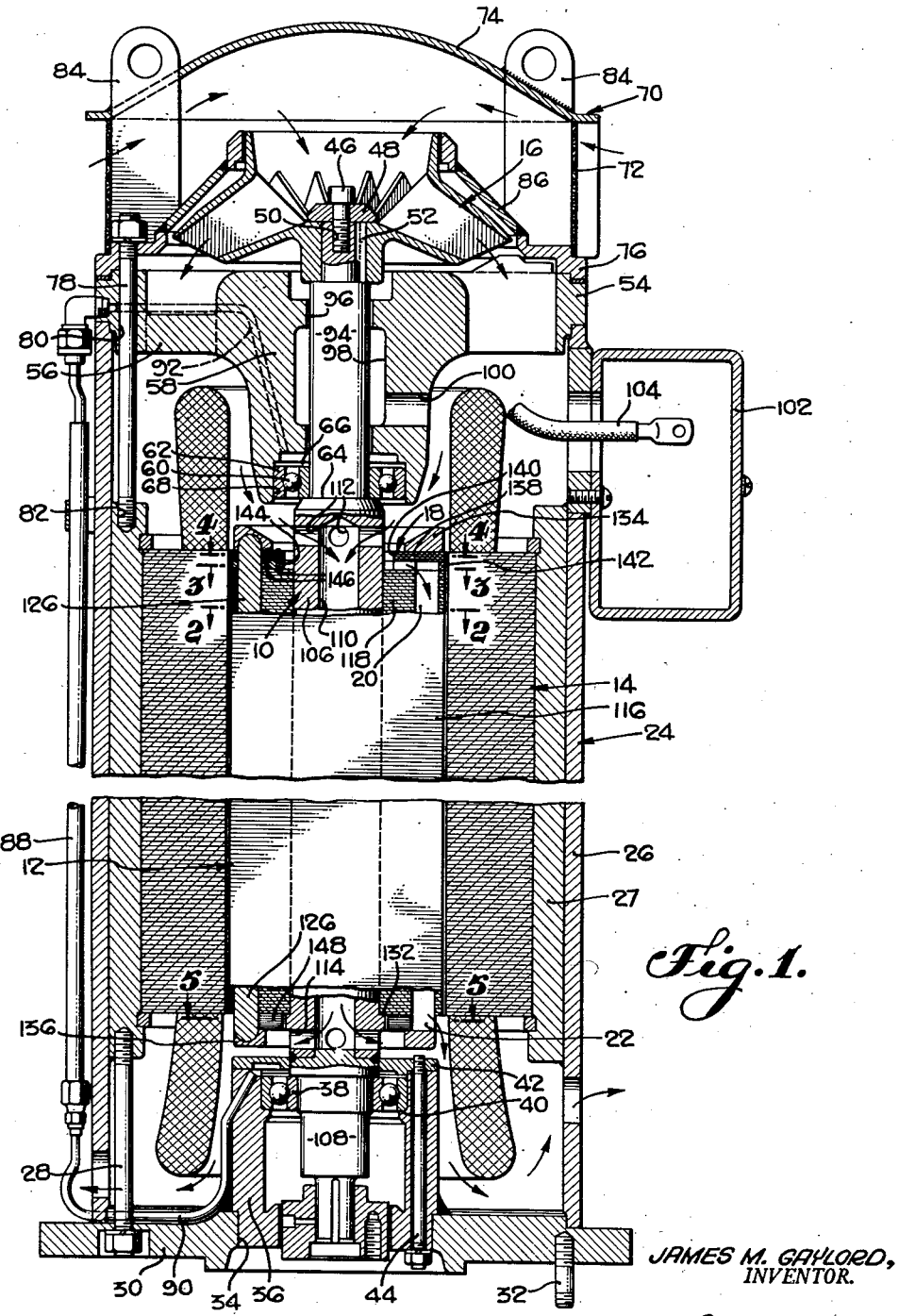
Figure 1 shows a side elevational view in section of a dynamo-electric machine embodying the instant invention, said view conforming generally to the section line 1—1 of Figure 2.

Referring to Figure 1 of the drawings, it will be seen that the combination in its more general aspect embodies a shaft 10 carrying a rotor 12 encompassed by a stator 14, a fan 16 being provided carried by the shaft 10. A pumping unit 18 is formed of integral parts of the rotor 12, from which pumping unit the cooling medium is driven through radially outwardly directed passages to the ducts 20 passing through the said rotor, the cooling medium passing through the ducts 20 and directly out from the rotor 12 at its extremity opposite from the pumping unit 18. It will be seen that the exit extremities 22 of the ducts 14 are radially outwardly of the pumping unit 18, and that at no time is the cooling medium required to be forced radially inwardly towards the shaft. Thus is provided an integral cooling system within the rotor 12 wherein cooling medium is drawn into the said rotor at a point closely adjacent the shaft thereof, is aided to pass radially outwardly in the rotor by centrifugal force, and is permitted, after traversing the said rotor, to pass directly from the end of said rotor without the loss of centrifugal head, which would be occasioned if the cooling medium were required to travel radially inwardly with respect to the said rotor at any point during its passage.

More particularly describing a preferred embodiment of the invention and referring to all the drawings, the combination includes a stationary housing 24 consisting of a cylindrical sleeve 26 backed by an inner sleeve 27 which may be integrally secured therewithin as by welding. Secured to the inner sleeve 27 by bolts 28 is a base member 30, which base member is provided with a plurality of mounting studs 32, whereby the assembly may be secured to a foundation or the like. A central aperture 34 is provided in the base plate 30, which receives a tubular lower bearing retainer 36 which may be welded thereto, and which carries a lower bearing 38, the said lower bearing 38 seating on annular shoulder 40 of the bearing retainer 36 and being restrained from upward movement by a keeper ring 42 held in place by the bolts 44. Turning within the said bearing 38 is the aforesaid shaft 10 which, as has been stated, carries the rotor 12 and the fan 16, the said fan being affixed to the shaft by a stud bolt 46 which extends through a retainer 48 into a threaded axial counterbore 50 formed in the upper end of the shaft 10, the fan being affixed non-rotatably to the shaft by a key 52.

Seated upon the upper end of the cylindrical sleeve 26 is an upper bearing retainer 54, the said upper bearing retainer having a series of radially extending supporting members 56 which carry a downwardly extending central section 58 housing the upper bearing 60, the inner race 62 of said bearing seating on a shoulder 64 of the shaft 10, and a small axial clearance 66 being provided in the counterbore 68 of the bearing retainer 54 to allow for axial thermal expansion of the shaft.

The bearing retainer 54 is held in place by a screen member 70, which consists generally of a screen 72, a dished cover 74, and a base element 76 bored to receive the bolts 78 which pass through bores 80 in the bearing retainer 54 and are received in threaded bores 82 in the inner sleeve 27. The screen 72 is clamped or otherwise secured between the peripheries of the base element 76 and dished cover 74 which are axially spaced by means of the handling lugs 84. A conical air deflector 86, having its base welded to the inner periphery of the base element 76, serves to deflect cooling medium from the fan downwardly through the assembly.

An oil conduit 88 is provided attached to one side of the housing 24 and serves to provide an oil mist to lubricate the bearings 38 and 60, which oil mist is delivered through auxiliary conduits 90 and 92 which terminate adjacent the lower and upper bearings 38 and 60, respectively. To insure against upward movement of the oil between the upper portion 94 of the shaft 10 and the bearing retainer 54, the bore 96 of said bearing retainer 54, which receives the said shaft portion 94, is enlarged to provide a pressure chamber 98, and radial passages 100 lead therefrom. The pressure within such pressure chamber 98 is thus maintained at substantially the same pressure as that existing exteriorly of the bore 96, and hence no upward movement of oil will be caused by circulation of the cooling medium. A terminal box 102 is affixed to the cylindrical sleeve 26 from which cables 104, one of which is shown, extend to the windings of the stator 14. The shaft 10 is made up of several sections, including the aforementioned reduced diameter portion 94, the main portion 106, which carries the rotor 12, and a lower portion 108 welded to the said main portion. The main portion 106 is formed with a central bore 110, which bore intersects at its upper and lower ends a plurality of smaller radial bores 112 and 114, respectively. The function of these several bores is to permit a portion of the downward flow of cooling medium from fan 16 to pass through the shaft in heat exchanging relationship to dissipate some of the heat produced within the rotor core.

Referring now to the elements of the combination which include the essence of the invention, the core 116 of the rotor 12 comprises a plurality of magnetic laminations 118 stacked together in the usual manner. The bulk of the laminations are substantially identical, being of circular disk form with a central aperture 120 for the reception of the shaft 10, and having a plurality of circumferentially spaced, alternately arranged rectangular slots 122 and triangular cutouts 124. When the laminations are assembled, the slots 122 receive conductor bars 126, which bars are embedded within said slots by welding material 128 deposited within the small passages 130 connected at the outer end of each slot with the periphery of the lamination. It will be noted that a seat 132 is adjacent the lower extremity of the shaft portion 106 upon which the laminations are stacked, and that the conductor bars 26 extend slightly above and below said laminations. Such upper and lower extensions are joined, respectively, by the deposit of brazing material, which brazing material is turned down to the desired cross-section to form upper end ring 134 and lower end ring 136, the upper end ring having an interior bevelled surface to facilitate the passage of cooling medium into the pumping unit 18.

In order to provide a pumping means 18 to force cooling medium into the ducts 20 formed by the triangular cutouts 124, a second group of laminations 138 is provided in axially spaced relationship to the main body of laminations 118, such laminations being provided with apertures 120 to receive the conductor bars 126, the said laminations being thereby positioned in a manner similar to the laminations 118. The laminations 138 are provided with central apertures 140 of greater diameter than the shaft 10 and are axially spaced from the aforesaid laminations 118 by a spacer ring 142, the inner periphery of which abuts the outer edges of the conductor bars 126. By this means is provided ingress of cooling medium to the ducts 20 of the principal laminations 118 past the upper end ring 134 of the conductor bars 126, through the aperture 140 of the laminations 138, and through the axial space between the respective laminations 138 and 118, said cooling medium flowing outwardly from its point of ingress at the upper end ring 134 to the ducts 20 and thereby being forced into said ducts by the centrifugal head existing between such radially separated points. Thus the aforementioned elements comprise the pumping unit 18 and are comprised of elements all forming component parts of the rotor assembly.

It will be noted that the aforesaid pumping unit 18 is provided with vanes in the form of the conductor bar 126 portions extending through the axial space between the laminations 138 and 118, and thus cooling medium is drawn by said vanes downwardly into the ducts 20. Since the volume of cooling medium drawn into the aforesaid ducts is proportionate to the number and the length of the vanes provided in the pump chamber, it may be found desirable to increase the pumped volume of cooling medium by providing on certain of the conductor bars 126 the extensions 144. Such extensions, as here shown, may extend from any desired number of conductor bars 126 and are preferably secured to the laminations 138 by means of the pins 146. For smoothly deflecting the flow of cooling medium outwardly toward the ducts 20, it is recommended that said extensions be bevelled as shown.

At the lower end of the rotor 12 are provided a third group of laminations 148 having the apertures 122 to receive the conductor bars 126, having the triangular cutouts 124 to provide a furtherance of the ducts 20, having enlarged central apertures 150 to accommodate the enlarged portion of the shaft 10, which provides the seat 132 for the laminations 118, and having an outer periphery of reduced diameter flush with the outer peripheries of the ducts 20. Such laminations are retained as part of the rotor core by the lower end ring 136, and since their triangular cutouts 124 are open at the radially outer ends provide the peripheral exit extremities 22 for the ducts 20, thus preserving the centrifugal head advantage accrued by the cooling medium as hereinbefore discussed.

As indicated by the directional arrows shown in Figure 1, upon rotor rotation the fan 16 directs downwardly the cooling medium toward the upper end of the rotor. While a portion of said cooling medium passes through the radial bores 112 into the central bore 110 of the shaft 10 and out through the radial bores 114 to cool the shaft, the major portion of the cooling medium is drawn into the upper portion of the ducts 20 by the pumping unit 18, said pumping unit being formed entirely of component parts of the assembly. Having obtained a centrifugal head by virtue of its passage into the ducts 20, the cooling medium passes through said ducts 20, and without losing said centrifugal head passes out through the exit extremities 22 of the ducts, thus having progressed in heat transfer relation from one end of the rotor to the other. It will be observed that with cooling means of such construction auxiliary pressuring means are avoided, full advantage is taken of the centrifugal forces available from the rotation of the rotor, and excessive parts are avoided. Temperature rise within the motor may be maintained within safe limits under the most rigid operating conditions and, indeed, the greater the speed at which the rotor is operated, the greater the pressure head developed within the pump chamber unit of the rotor, thereby forcing a larger volume of cooling medium into the rotor ducts whereby to provide enhanced heat transfer.

While there has been described what is at present considered to be a preferred embodiment of the invention, it will be apparent to those skilled in the art that various changes may be made without departing from the essence of the invention, and it is intended to cover herein all such modifications and changes as are within the true scope and spirit of the appended claims. In this regard, it is evident that although the invention has been applied in this description to a high-speed electric motor, it is not limited to such machines and may be equally well applied to other types of dynamo-electric machines such as generators.

I claim:

1. In a rotor for a dynamo-electric machine: a rotor body, said rotor body including a first group of laminations having cutout portions defining axial ducts in the outer radial portion of said rotor body; a second group of laminations adjacent said first group axially spaced therefrom to provide a pump chamber therebetween; spacer means sealing said pump chamber but permitting communication between said ducts and said pump chamber; and an inlet for cooling medium to said pump chamber and thereby said ducts radially inwardly from said ducts, said ducts opening at the end of said first group of laminations opposite from said second group to permit egress of cooling medium radially outwardly of said ducts.

2. In a rotor for a dynamo-electric machine: a rotor body, said rotor body including a first group of laminations having cutout portions defining axial ducts in the outer radial portion of said rotor body; a second group of laminations adjacent said first group axially spaced therefrom to provide a pump chamber therebetween; spacer means sealing said pump chamber but permitting communication between said ducts and said pump chamber; rotor conductor bars extending through said laminations and said pump chamber to provide pump vanes within said pump chamber; an inlet for cooling medium to said pump chamber and thereby said ducts radially inwardly from said ducts; and an outlet for said cooling medium from said ducts at the end of said first group of laminations opposite from said second group.

3. In a rotor for a dynamo-electric machine: a rotor body, said rotor body including a first group of laminations having cutout portions defining axial ducts in the outer radial portion of said rotor body; a second group of laminations adjacent said first group axially spaced therefrom to provide a pump chamber therebetween; spacer means sealing said pump chamber but permitting communication between said axial ducts and said pump chamber; rotor conductor bars extending through said laminations and said pump chamber and providing pump vanes within said pump chamber; radially inwardly directed extensions of said rotor conductor bars within said pump chamber; an inlet for cooling medium to said pump chamber and thereby said ducts radially inwardly from said ducts; and an outlet for said cooling medium from said ducts at the end of said first group of laminations opposite from said second group.

4. In a rotor for a dynamo-electric machine: a rotor body, said rotor body including a first group of laminations having cutout portions defining axial ducts in the outer radial portion of said rotor body; a second group of laminations adjacent said first group axially spaced therefrom to provide a pump chamber therebetween; spacer means sealing said pump chamber but permitting communication between said ducts and said pump chamber; an inlet for cooling medium to said pump chamber and thereby said ducts radially inwardly from said ducts; and a third group of laminations adjacent said first group at its end opposite from said second group, the laminations of said third group having lesser outer diameters than those of said first group whereby to provide an opening for said ducts to permit said cooling medium to pass directly outwardly of said ducts.

5. In a rotor for a dynamo-electric machine: a rotor body, said rotor body including a first group of laminations having cutout portions defining axial ducts in the outer radial portion of said rotor body; a second group of laminations adjacent said first group axially spaced therefrom to provide a pump chamber therebetween; spacer means sealing said pump chamber but permitting communication between said ducts and said pump chamber; an inlet for cooling medium to said pump chamber and thereby said ducts radially inwardly from said ducts; a third group of laminations adjacent said first group at its end opposite from said second group, the laminations of said third group having lesser outer diameters than those of said first group whereby to provide an opening for said ducts to permit said cooling medium to pass directly outwardly of said ducts; and rotor conductor bars extending through said laminations and said pump chamber and providing pump vanes within said pump chamber.

6. In a rotor for a dynamo-electric machine: a rotor body, said rotor body including a first portion having a plurality of axial ducts defined adjacent its outer periphery; a second rotor body portion adjacent said first portion axially spaced therefrom to provide a pump chamber therebetween; spacer means sealing said pump chamber but permitting communication between said axial ducts and said pump chamber; rotor conductor bars extending through said rotor body and said pump chamber and providing pump vanes within said pump chamber; radially inwardly directed extensions of said rotor conductor bars within said pump chamber; an inlet for cooling medium to said pump chamber and thereby said ducts radially inwardly from said ducts; and an outlet for said cooling medium from said ducts at the end of said first rotor body portion opposite from said second rotor body portion.

JAMES M. GAYLORD.

REFERENCES CITED

The following references are of record in the file of this patent:

UNITED STATES PATENTS

| Number | Name | Date |
|---|---|---|
| 920,798 | Wiard | May 4, 1909 |
| 1,451,577 | Jantzen | Apr. 10, 1923 |
| 2,425,997 | Criner | Aug. 19, 1947 |

FOREIGN PATENTS

| Number | Country | Date |
|---|---|---|
| 516,866 | France | Dec. 10, 1920 |
| 192,525 | Germany | Nov. 18, 1907 |